United States Patent
Jolfaei (10) Patent No.: US 10,102,239 B2
(45) Date of Patent: Oct. 16, 2018

(54) APPLICATION EVENT BRIDGE

(71) Applicant: SAP SE, Walldorf (DE)

(72) Inventor: Masoud Aghadavoodi Jolfaei, Wiesloch (DE)

(73) Assignee: SAP SE, Walldorf (DE)

( * ) Notice: Subject to any disclaimer, the term of this patent is extended or adjusted under 35 U.S.C. 154(b) by 471 days.

(21) Appl. No.: 14/797,408

(22) Filed: Jul. 13, 2015

(65) Prior Publication Data

US 2017/0017677 A1   Jan. 19, 2017

(51) Int. Cl.
*G06F 17/30* (2006.01)
*G06F 17/00* (2006.01)

(52) U.S. Cl.
CPC .............. *G06F 17/30368* (2013.01)

(58) Field of Classification Search
CPC .............. G06F 9/542; G06F 17/30368; G06F 17/30575; G06F 17/2235; G06F 2209/544; G06F 11/3065; G06F 17/30144; G06F 17/30589; G06F 17/30864; G06F 17/30908; G06F 3/04842; G06F 9/4401; G06F 9/547; G06F 17/2288; G06F 17/30067; G06F 3/0481; G06F 11/3006; G06F 11/3017; G06F 11/3055; G06F 11/3079; G06F 17/246; G06F 17/30088; G06F 17/3012; G06F 17/30212; G06F 17/30292; G06F 17/30345; G06F 17/30383; G06F 17/30386; G06F 17/3043; G06F 17/3053; G06F 17/30554; G06F 17/30578; G06F 17/30581; G06F 17/30607
See application file for complete search history.

(56) References Cited

U.S. PATENT DOCUMENTS

| | | | |
|---|---|---|---|
| 5,826,253 A * | 10/1998 | Bredenberg | ........ G06F 12/0815 |
| 7,823,170 B2 | 10/2010 | Jolfaei et al. | |
| 8,051,152 B2 | 11/2011 | Rehm et al. | |
| 8,140,580 B2 | 3/2012 | Rehm et al. | |
| 8,275,848 B2 * | 9/2012 | Atashband | ............. G07F 17/32 463/24 |
| 8,635,178 B2 | 1/2014 | Jolfaei | |
| 8,701,180 B2 | 4/2014 | Jolfaei | |
| 8,706,844 B2 | 4/2014 | Jolfaei | |
| 8,706,887 B2 | 4/2014 | Jolfaei | |
| 8,826,308 B1 | 9/2014 | Jolfaei et al. | |
| 8,843,526 B2 | 9/2014 | Stoeck et al. | |
| 9,043,815 B2 | 5/2015 | Jolfaei et al. | |

(Continued)

*Primary Examiner* — Yicun Wu
(74) *Attorney, Agent, or Firm* — Fish & Richardson P.C.

(57) ABSTRACT

The disclosure generally describes methods, software, and systems, including a method for event notification associated with changed data objects. A change to a data object associated with a change notification rule is identified. The change notification rule defines at least one target system to be notified in response to changes to a data set. A notification event identifying the data object associated with the change is generated substantially instantaneously in response to the identified change. Substantially instantaneously and in response to the generation of the notification event, the notification event is sent to the at least one target system defined by the change notification rules. A request for the changed data object is received in response to the sent notification event. The changed data object is provided to the target system.

17 Claims, 3 Drawing Sheets

(56) References Cited

U.S. PATENT DOCUMENTS

| | | | |
|---|---|---|---|
| 2003/0225840 A1* | 12/2003 | Glassco | G06Q 10/10 |
| | | | 709/206 |
| 2004/0193653 A1* | 9/2004 | Howard | G06F 17/30368 |
| 2004/0205048 A1* | 10/2004 | Pizzo | G06F 17/30368 |
| 2011/0119326 A1 | 5/2011 | Jolfaei | |
| 2012/0011515 A1 | 1/2012 | Jolfaei et al. | |
| 2013/0191882 A1 | 7/2013 | Jolfaei | |
| 2014/0180737 A1 | 6/2014 | Acker et al. | |
| 2015/0105109 A1* | 4/2015 | Hegde | H04W 68/00 |
| | | | 455/458 |

* cited by examiner

APPLICATION EVENT BRIDGE

BACKGROUND

The present disclosure relates to event notification.

Users of applications generally want to see the most up-to-date values for some types of information. For example, as stock prices fluctuate constantly, investors and brokers need to know a current price of a stock rather than a price that may be several minutes old. When investors and brokers use the same system or systems that are fully integrated, the information can be kept current at all times. For some types of information, a relatively current value may be acceptable, such as the previous day's value.

SUMMARY

The disclosure generally describes computer-implemented methods, software, and systems for event notification associated with changed data objects. A change to a data object associated with a change notification rule is identified. The change notification rule defines at least one target system to be notified in response to changes to a data set. A notification event identifying the data object associated with the change is generated substantially instantaneously in response to the identified change. Substantially instantaneously and in response to the generation of the notification event, the notification event is sent to the at least one target system defined by the change notification rules. A request for the changed data object is received in response to the sent notification event. The changed data object is provided to the target system.

The present disclosure relates to computer-implemented methods, software, and systems for generating executable components. One computer-implemented method includes: identifying a change to a data object associated with a change notification rule, the change notification rule defining at least one target system to be notified in response to changes to a data set; generating, substantially instantaneously in response to the identified change, a notification event identifying the data object associated with the change; sending, substantially instantaneously in response to the generation of the notification event, the notification event to the at least one target system defined by the change notification rule; receiving a request, in response to the sent notification event, for the changed data object; and providing the changed data object to the target system The foregoing and other implementations can each optionally include one or more of the following features, alone or in combination. In particular, one implementation can include all the following features:

In a first aspect, combinable with any of the previous aspects, the change notification rule associates data objects with particular target systems, such that identified changes to particular data objects associated with a change notification rule result in a generated notification event being sent to one or more corresponding target systems.

In a second aspect, combinable with any of the previous aspects, the target system forwards the notification event to at least one destination system different than the target system.

In a third aspect, combinable with any of the previous aspects, the destination system is registered to receive notifications associated with the changed data object at the target system.

In a fourth aspect, combinable with any of the previous aspects, the target system identifies at least one destination system based on a target system notification table setting.

In a fifth aspect, combinable with any of the previous aspects, the target system transports the notification event to the at least one destination system without modifying the notification event.

In a sixth aspect, combinable with any of the previous aspects, the notification event is sent via a WebSocket connection.

In a seventh aspect, combinable with any of the previous aspects, the notification event is pushed to the target system substantially instantaneously in response to the generation of the notification event.

In an eighth aspect, combinable with any of the previous aspects, the notification event identifies the data object being changed and change metadata including at least a type of change.

In a ninth aspect, combinable with any of the previous aspects, a second target system sends the request for the changed data object to the backend system.

In a tenth aspect, combinable with any of the previous aspects, providing the changed data object to the target system includes sending the changed data object to the target system for relaying the changed data object to the second target system.

In an eleventh aspect, combinable with any of the previous aspects, the computer-implemented method further includes pushing publicly accessible information to different target systems.

The subject matter described in this specification can be implemented in particular implementations so as to realize one or more of the following advantages. Users can see values that are kept updated in near real-time even if the values come from other systems and applications. Important data values, e.g., key performance indicators, can effectively be replicated from system to system. Notifications can be provided to other systems and applications that a business object's value has changed, and the other systems and applications can decide whether or not to request the updated value. Events and notifications transferred as small-sized messages can reduce overhead and message transfer size, and reduce processing time.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for providing notifications associated with, and handling requests to receive, changed data. For example, when a data object on one system changes, other systems can be notified of the change according to change notification rules. The other systems can then optionally request the updated information.

In some implementations, interactive and collaborative scenarios can consist of mainly event-driven user interfaces (UIs). End users can often expect real-time web behavior, e.g., including displaying the most up-to-date information. To meet these expectations, a near real-time infrastructure can be provided to exchange messages and events between user contexts and UI sessions residing on different application servers within the same system or on different systems.

In some implementations, event notifications can be used for changes to business objects identified to backend systems, e.g., for notifying highly interactive and real-time responsive user interfaces and a near real-time transfer of those events to associated user agents. For example, applications can require the consumption of events and notifications that are emitted in real-time from business systems. Notifications associated with changes to business objects can be made to UI applications, e.g., for business objects that are displayed or provided by user agents. The user agents, for example, can initiate requests to read the new data and automatically refresh the UI displays. In some implementations, important alerts and/or messages can be displayed without any corresponding user interaction or collaborative viewing of shared business documents.

Notifications to user agents can be important, for example, for events that originate from a backend system not directly connected to the user agent. In some implementations, this type of event can be transferred across several connected systems to the UI application, such as applications across several business systems that interact with each other. These types of business systems can include, for example, enterprise resource planning (ERP), customer relationship management (CRM), and supply chain management (SCM), to name a few.

In some implementations, gateway systems can provide direct access to backend services. The Gateway systems can serve as front-end systems that are connected to business backend systems, e.g., ERP, CRM, and SCM.

In some implementations, a solution manager can serve as a central support and system management suite provided to a system's customers as part of their license agreement. The solution manger can be installed, for example, as a stand-alone system and connected in a star topology to business backend systems, e.g., business suite systems. In some implementations, process integration (PI) can support or provide central middleware for message exchange between various systems.

In some implementations, cloud platforms can be provided that are based on open standards and provide access to a development environment in the cloud. The cloud platforms can serve, for example, as extension platforms to the existing systems and business suite applications.

In some implementations, applications that include collaborative and auto-refresh capabilities can require the consumption of a number of events and notifications which are emitted from a backend system. For example, the notifications can be transferred through a front-end or gateway system to applications, e.g., in near real-time (e.g., within a few seconds or less). In some implementations, the exchange of small-sized events across different business systems in near real-time can require different communication capabilities as the existing request-response oriented communication infrastructures provide, e.g., including remote function call (RFC), Hyper Text Transfer Protocol (HTTP), or HTTP Secure (HTTPS).

In some implementations, an event bridge can be used for connections between systems and for the exchange of events in real-time. The event bridge can provide, for example, different kinds of event handling, such as best-effort (BE), exactly once (EO), exactly once in order (EIIO), and other types of queueing and event handling capabilities. Events can be either consumed in a receiver system or forwarded immediately to the UI applications. In some implementations, the event bridge can be an integrated part of application servers, e.g., fulfilling security, supportability and high-availability requirements and providing configuration tools to define and establish event flows between systems.

Figure 1:
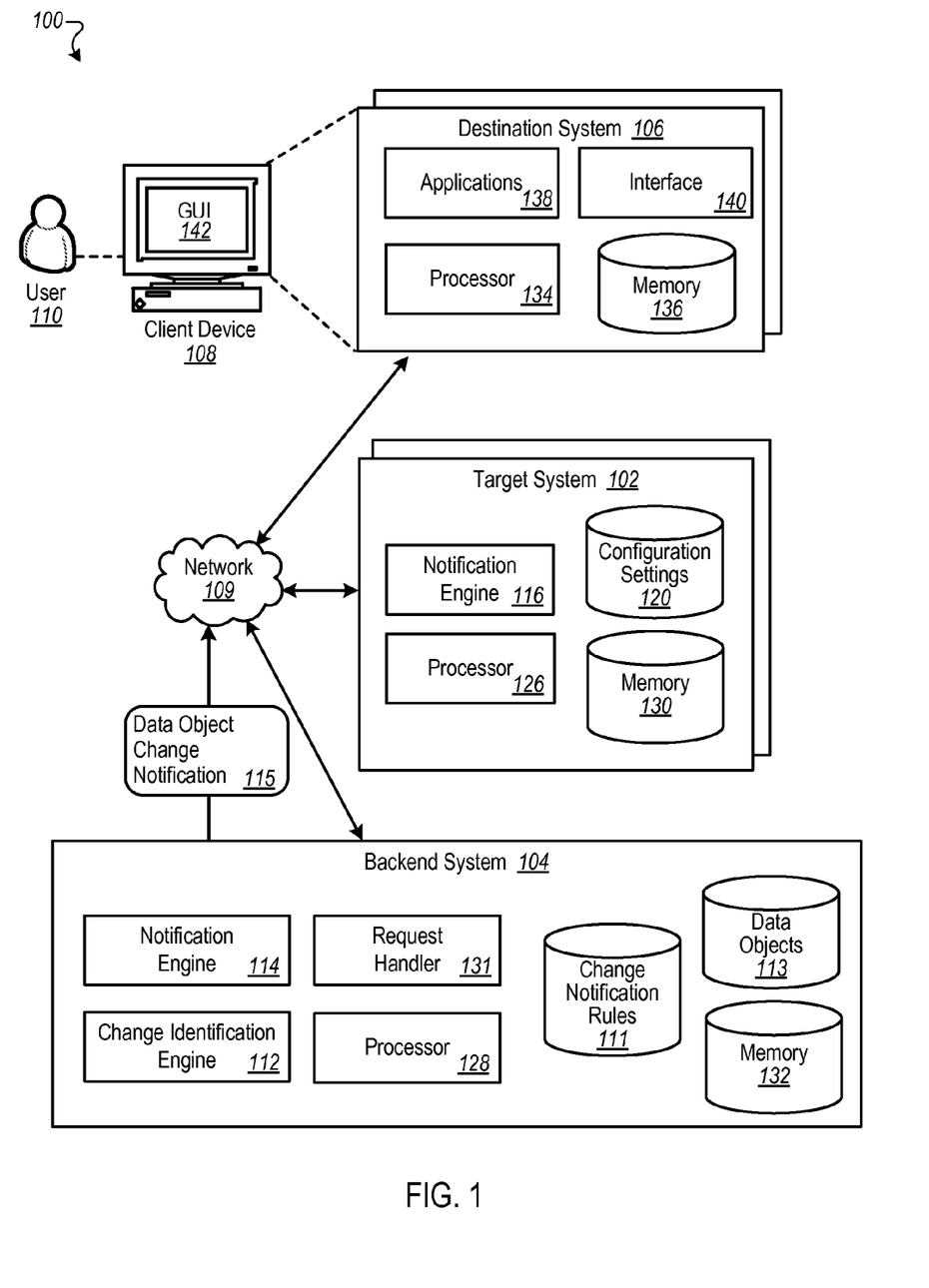
FIG. 1 is a block diagram of an example environment for providing notifications for changes to data objects.

FIG. 1 is a block diagram of an example environment 100 for providing notifications for changes to data objects. The illustrated environment 100 includes, or is communicably coupled with, a backend system 104, at least one target system 102, and plural destination systems 106, all connected using a network 109. In some implementations, the target system 102 can be a gateway system, e.g., that serves as a layer above the backend system 104. The environment 100 can be used, for example, to identify changes in one or more data objects (e.g., business objects). Based on the changes, the environment 100 can provide and process notifications associated with the changes, and provide updated data in response to the notifications. For example, a notification event (described in more detail with respect to FIG. 2) associated with a changed data object can be generated by the backend system 104 and provided to a specific one of the target systems 102 for forwarding to one or more of the plural destination systems 106. Each destination system 106, for example, can request updated data (e.g., from the backend system 104) based on the change. In some implementations, each destination system 106 can include or be coupled with at least one client device 108 used by a user 110. For example, the user 110 can use applications running on the client device 108 that use data objects accessible by the environment 100 and are managed, e.g., at least in part, by the backend system 104.

At a high level, the backend system 104 comprises an electronic computing device operable to store and provide access to resources for use by the target system 102 and plural destination systems 106. The backend system 104 can include a change identification engine 112 that can identify a change to a data object, e.g., stored in a data store of data objects 113. In some implementations, identification of the change can occur upon receipt of an updated field or data object received from the destination system 106 or another source. In some implementations, identification of the change can occur in other ways, e.g., by intermittently reviewing timestamps of updated rows in the data store of data objects 113. In some implementations, a business object framework can detect changes to business objects. For example, based on database triggers, changes to database entities (e.g., tables and views) that represent business objects can be identified. A notification engine 114, for example, can generate a data object change notification 115, including an event notification indicating that at least one specific data object has changed. In some implementations, notifications that are generated can be identified according to change notification rules 111, e.g., that identify which target systems 102 are to be notified upon a change to a specific business object. For example, based at least on information in the change notification rules 111, the notification engine 114 can identify a target system (e.g., the target system 102) to be notified of the change and push the event notification associated with the change to the target system 102. In some implementations, the data store of data objects 113 can be stored or distributed in plural locations, e.g., at the backend system 104, the target system 102, the plural destination systems 106, and/or other locations. In some implementations, notifications can be sent to a first target system and then forwarded, e.g., in sequence, to a second and potentially other target systems. Further, the notifications can be changed or left unchanged by each respective target system, which can each determine additional systems to which the notifications are to be provided.

At a high level, the target system 102 comprises an electronic computing device operable to receive and forward event notifications, such as the data object change notification 115. For example, the target system 102 can include a notification engine 116 that can identify at least one destination system 106 to be notified of the changed data object upon receipt of an event notification (e.g., the data object change notification 115). Identification of the at least one destination system 106 can be based, for example, on information in configuration settings 120 that identify systems or other entities that are to be notified for changes to specific data objects. The notification engine 116, for example, can provide (e.g., forward) the received data object change notification 115 to the at least one destination system 106 that is identified.

At a high level, each destination system 106 comprises an electronic computing device operable to receive the event notification (e.g., the data object change notification 115) from the target system 102. In response to receipt of the event notification, the destination system 106 can request an update associated with the change from the backend system 104.

As used in the present disclosure, the term "computer" is intended to encompass any suitable processing device. For example, although FIG. 1 illustrates a single backend system 104, the environment 100 can be implemented using two or more backend systems 104, as well as computers other than servers, including a server pool. Indeed, the backend system 104, the target systems 102, and the destination systems 106 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated backend system 104 may be adapted to execute any operating system, including Linux, UNIX, Windows, Mac OS®, Java™, Android™, iOS or any other suitable operating system. According to some implementations, the backend system 104 may also include, or be communicably coupled with, an e-mail server, a web server, a caching server, a streaming data server, and/or other suitable server(s). In some implementations, components of the backend system 104 may be distributed in different locations and coupled using the network 109.

The target system 102 includes a processor 126 and memory 130. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 126 executes instructions and manipulates data to perform the operations of the target system 102. Specifically, the processor 126 executes the functionality required to receive and process requests from the target system 102. In some implementations, the memory 130 can store the configuration settings 120.

The backend system 104 includes a processor 128 and memory 132. Although illustrated as the single processor 128 in FIG. 1, two or more processors 128 may be used according to particular needs, desires, or particular implementations of the environment 100. Each processor 128 may be a central processing unit (CPU), an application specific integrated circuit (ASIC), a field-programmable gate array (FPGA), or another suitable component. Generally, the processor 128 executes instructions and manipulates data to perform the operations of the backend system 104. Specifically, the processor 128 executes the functionality required to receive and process requests from the backend system 104. In some implementations, the memory 132 can store the change notification rules 111 and/or the data store of data objects 113.

The memory 132 or multiple memories 132 may include any type of memory or database module and may take the form of volatile and/or non-volatile memory including, without limitation, magnetic media, optical media, random access memory (RAM), read-only memory (ROM), removable media, or any other suitable local or remote memory component. The memory 132 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the backend system 104.

Each destination system 106 (and each target system 102) of the environment 100 may be any computing device operable to connect to, or communicate with, other systems via the network 109 using a wire-line or wireless connection. In general, each destination system 106 (and each target system 102) comprises an electronic computer device operable to receive, transmit, process, and store any appropriate data associated with the environment 100 of FIG. 1.

A request handler 131, e.g., can handle requests received from the target system 102, e.g., forwarded from the destination system 106, for an updated version of a data object. The request handler 131 can also receive requests received from the target system 102 to store updated values of data objects, e.g., for storage in a data store of data objects 113. In some implementations, the data store of data objects 113 can include one or more relation data bases and/or other storage structures, and the stored data may be stored locally or distributed.

The illustrated destination system 106 further includes a processor 134, a memory 136, applications 138, and an interface 140. The interface 140 is used by the destination system 106 for communicating with other systems in a distributed environment—including within the environment 100—connected to the network 109, e.g., the target system 102, as well as other systems communicably coupled to the network 109 (not illustrated). Generally, the interface 140 comprises logic encoded in software and/or hardware in a suitable combination and operable to communicate with the network 109. More specifically, the interface 140 may comprise software supporting one or more communication protocols associated with communications such that the network 109 or interface's hardware is operable to communicate physical signals within and outside of the illustrated environment 100.

Applications 138, for example, can receive and provide information to the users 110 on each of the respective destination systems 106. The information can include, for example, values of business objects, including displaying values of business objects that have changed, e.g., through the actions of users 110 on other ones of the destination systems 106. As an example, the value of an employee object changed on a first destination system 106 can be presented (e.g., through near real-time updates) on a second destination system 106. In some implementations, notifications and updates to data objects can occur using an event bridge, as described below.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the destination system 106 includes the processor 134. Although illustrated as the single processor 134 in FIG. 1, two or more processors 134 may be used according to particular needs, desires, or particular implementations of the environment 100. Each processor 134 may be a central processing unit (CPU), an application specific integrated circuit (ASIC), a field-programmable gate array (FPGA), or another suitable component. Generally, the processor 134 executes instructions and manipulates data to perform the operations of the destination system 106. Specifically, the processor 134 executes the functionality required to send requests (e.g., through the target system 102) to the backend system 104 and to receive and process responses from the backend system 104.

The illustrated destination system 106 also includes a memory 136, or multiple memories 136. The memory 136 may include any memory or database module and may take the form of volatile or non-volatile memory including, without limitation, magnetic media, optical media, random access memory (RAM), read-only memory (ROM), removable media, or any other suitable local or remote memory component. The memory 136 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the destination system 106.

The illustrated destination system 106 is intended to encompass any computing device such as a smart phone, tablet computing device, PDA, desktop computer, laptop/notebook computer, wireless data port, one or more processors within these devices, or any other suitable processing device. For example, the destination system 106 may comprise a computer that includes an input device, such as a keypad, touch screen, or other device that can accept user information, and an output device that conveys information associated with the operation of the backend system 104 or the destination system 106 itself, including digital data, visual information, or a graphical user interface (GUI) 142, as shown with respect to and included by the destination system 106. The GUI 142 interfaces with at least a portion of the environment 100 for any suitable purpose, including generating user interface screens for using templates and providing parameters for customizing the templates to generate code.

Figure 2:
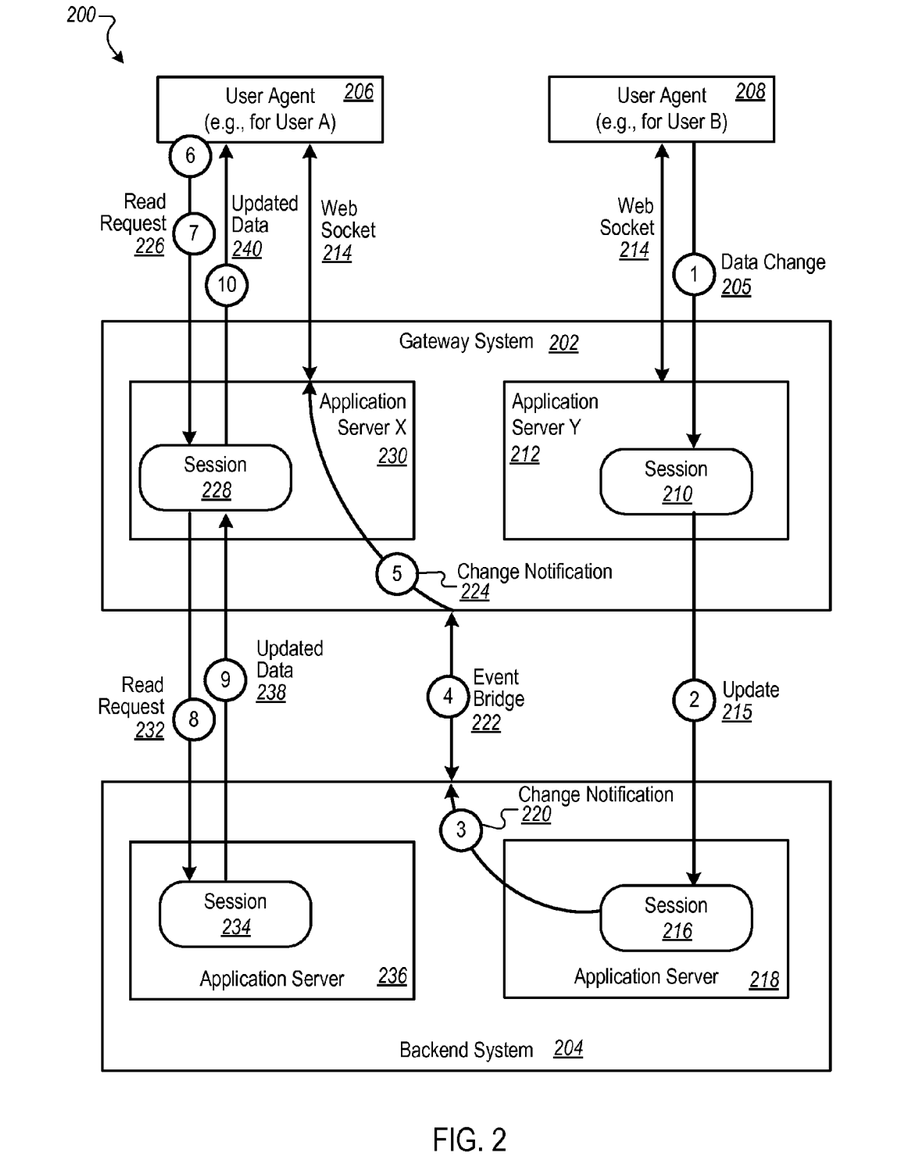
FIG. 2 is a block diagram of an example interaction model for a real-time transfer of events between a gateway system and a backend system.

FIG. 2 is a block diagram of an example interaction model 200 for a real-time transfer of events between a gateway system 202 and a backend system 204. For example, an event can be associated with a data change 205, such as an updated value for a business object. In some implementations, the gateway system 202 can be an enterprise resource planning (ERP) system that operates as a front-end system to users, e.g., through user agents 206 and 208 that are associated with applications used by Users A and B, respectively. The backend system 204, for example, can be a backend system that is based on or uses an advanced business application programming event bridge (e.g., event bridge 222). In some implementations, the user agents 206 and 208 can be applications that use the same business objects, e.g., including an Entity X. As such, changes to Entity X by one user agent may be of interest to the other user agent. For example, using the interaction model 200, a change to a business object used by User A may need to appear updated, e.g., in real-time, to User B. Entity X can be, for example, a single value (e.g., a key performance indicator (KPI), stock price, or other key value), a set of values, a row in a database table, or some other value set. In some implementations, the gateway system 202 can be implemented using the target system 102. In some implementations, the backend system 204 can be implemented using the backend system 104. In some implementations, the user agents 206 and 208 can be implemented as the destination system 106.

In an example flow of stages in the interaction model 200, at stage 1, the data change 205 (e.g., a change to Entity X, such as a business object) can be initiated by the user agent 208. In some implementations, the data change 205 can be transmitted using Hypertext Transfer Protocol (HTTP) or some other protocol. The change to Entity X can occur, for example, during use of a session 210 associated with an application server Y 212. In some implementations, communication between user agents (e.g., including user agent 208) can occur using a web socket 214. At stage 2, the change can be forwarded to the gateway system 202. Forwarding the change can be handled, for example, using an OData protocol, such as a remote function call (RFC). The forwarded change can be received in a session 216 executing on an application server 218.

At stage 3, a change notification 220 (e.g., an event) can be created by the backend system 204, such as by the session 216. The change notification 220 can be made, for example, in accordance with event bridge configuration rules specifying that notification of a change to Entity X is to be forwarded automatically. At stage 4, the event bridge 222 can be used to forward the change notification 220 to the gateway system 202. At stage 5, a change notification 224 (e.g., the forwarded change notification 220) can be forwarded to the user agent 206. In some implementations, the forwarding can use the web socket 214 or other connection.

An application in the user agent 206 can identify the change to Entity X and can trigger, at stage 6, a determination of the updated value of Entity X. At stage 7, for example, a read request 226 can be sent by the user agent 206 to the gateway system 202. The request can be received, for example, at a session 228 of an application 230. At stage 8, a read request 232 can be provided by the gateway system 202 to the backend system 204. A session 234 in an application server can process the received request and provide the requested data at stage 9. At stage 10, updated data 240 (e.g., the updated value of Entity X) can be provided by the gateway system 202 to the user agent 206. At the user agent 206, a screen accessible to User A can be updated using the updated value of Entity X.

In some implementations, the event bridge 222 can enable a real-time transfer and/or notification of events between systems. For example, the event bridge 222 can provide real-time progress information associated with a business workflow across different systems and/or notification of changes to master data, effectively replicating the information to different systems and keeping the information in sync across affected systems.

As an example, consider a list of employees that is implemented as a business object consisting of three attributes, e.g., a first name, a last name, and performance information. The list of employees can be established in two different user interface (UI) application types, e.g., Type A and Type B, each using the same underlying business object. The UI applications may be executed at the same time, e.g., independently on two different systems. Any changes to an employee entry in an application on one system can be pushed automatically and simultaneously to other UI applications, e.g., using communication channels included in the interaction model 200. The event bridge 222 can allow changes to the employee information in any of the connected systems to be simultaneously forwarded to the other systems and propagated to other UI applications. As a result, associated persisted business objects can be automatically synchronized across the systems, e.g., using change notification rules. For example, a change to Entity X in one UI application can show up, as an updated value, almost instantaneously on another UI application.

Figure 3:
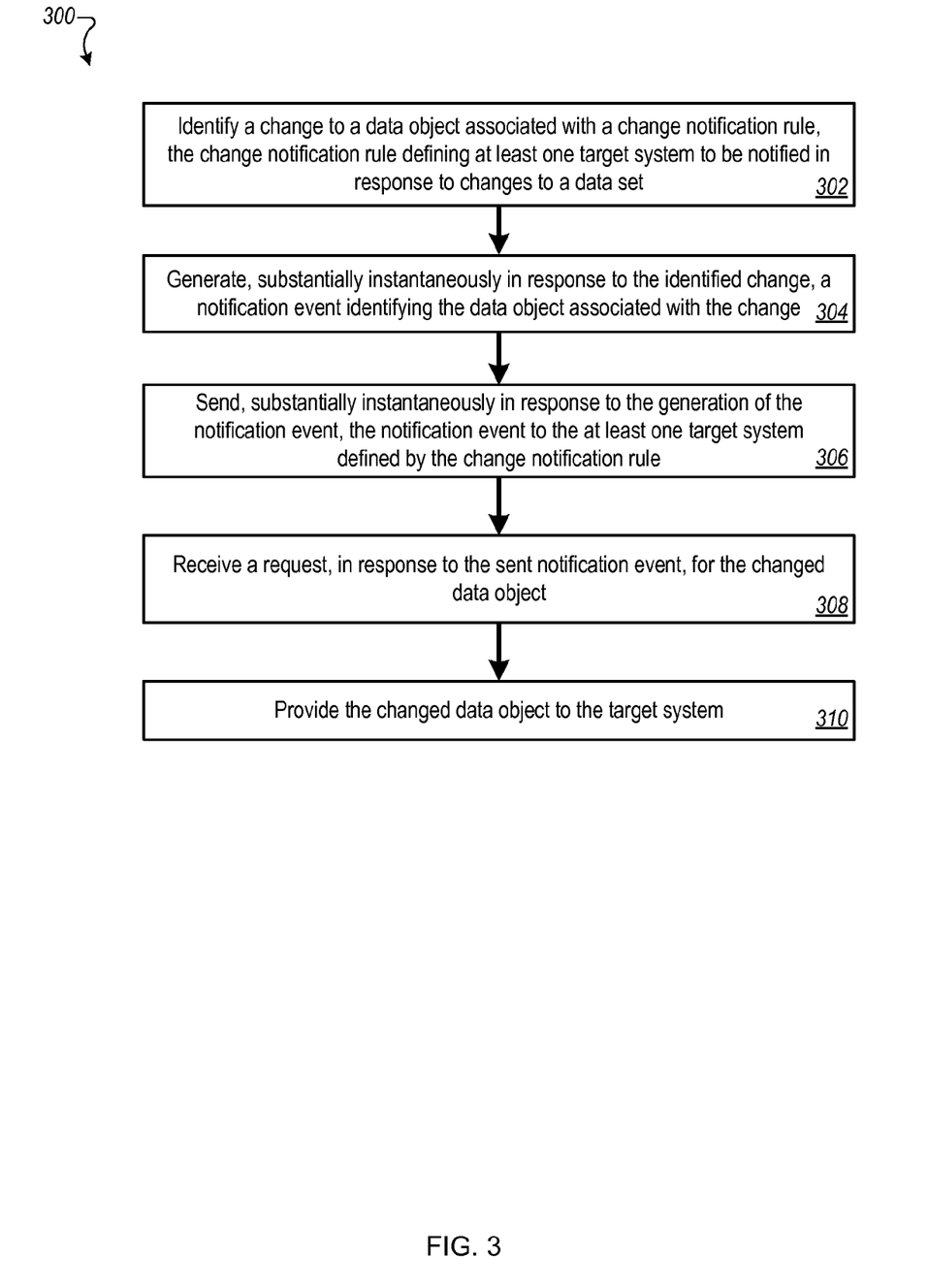
FIG. 3 is a flowchart of an example method for notifying of and providing changed data across systems.

FIG. 3 is a flowchart of an example method 300 for notifying of and providing changed data across systems. For clarity of presentation, the description that follows generally describes method 300 in the context of FIGS. 1-2. However, it will be understood that the method 300 may be performed, for example, by any other suitable system, environment, software, and hardware, or a combination of systems, environments, software, and hardware as appropriate. In some implementations, the backend system 104 and/or its components can be used to execute the method 300.

At 302, a change to a data object associated with a change notification rule is identified. The change notification rule defines at least one target system to be notified in response to changes to a data set. For example, a specific one of the change notification rules 111 can indicate that an employee record that is changed is to trigger notification to specific ones of one or more target systems 102, e.g., for coordination with updates of the changed data for presentation on corresponding ones of destination systems 106.

In some implementations, change notification rule associates data objects with particular target systems, such that identified changes to particular data objects associated with a change notification rule result in a generated notification event being sent to one or more corresponding target systems. For example, the change notification rules 111 may stipulate that any change(s) (or certain types of changes) to data object X are to trigger notifications of the change(s) to one or more specific target systems 102. The data change 205 is an example of such a change, e.g., received at the backend system 204 as the update 215.

At 304, a notification event identifying the data object associated with the change is generated substantially instantaneously in response to the identified change. For example, the backend system 204 can generate the change notification 220 within a few seconds or less, in order to support near-real-time updates on other systems.

At 306, substantially instantaneously in response to the generation of the notification event, the notification event is sent to the at least one target system defined by the change notification rules. For example, using the event bridge 222, the notification event can be sent to specific target systems 102.

In some implementations, the notification event identifies the data object being changed and change metadata including at least a type of change. As an example, the change notification 224 can include information that an employee name field in an employee business object has changed.

In some implementations, the notification event is sent via a WebSocket connection. For example, communication of change events from the target system to the user agent 206 can use the web socket 214.

In some implementations, the notification event is pushed to the target system substantially instantaneously in response to the generation of the notification event. For example, the backend system 204 can generate the change notification 220 immediately after receipt of the update 215.

In some implementations, the target system forwards the notification event to at least one destination system different than the target system. For example, the gateway system 202 can push notifications such as the change notification 224 to one or more user agents 206 and 208.

In some implementations, the destination system is registered to receive notifications associated with the changed data object at the target system. As an example, the user agent 206 can receive the change notification 224.

In some implementations, the target system identifies at least one destination system based on a target system notification table setting. For example, the gateway system 202 can identify multiple user agents that are to be notified for a particular update 215.

In some implementations, the target system transports the notification event to the at least one destination system without modifying the notification event. For example, the gateway system 202 can forward the change notification 224 as-is to the user agent 206.

At 308, a request for the changed data object is received in response to the sent notification event. For example, the backend system can receive the read request 232 associated with the update 215.

In some implementations, a second target system sends the request for the changed data object to the backend system. For example, the gateway system 202 can send the forward the read request 226 to the backend system as the read request 232.

At 310, the changed data object is provided to the target system. As an example, the backend system 204 can provide the requested updated data 238.

In some implementations, providing the changed data object to the target system includes sending the changed data object to the target system for relaying the changed data object to the second target system. For example, the gateway system 202 can forward the updated data 238 to the user agent 206 as the updated data 240.

In some implementations, the method 300 further includes pushing publicly accessible information to different target systems (and ultimately to different destination systems). For example, a change notification, instead of containing user-specific (and security relevant) information, can include publicly available system information. The information can include, for example, health check information of an application server or system news, and the information can be pushed directly to target systems. Pushing information in this way can reduce the notification time from a source system to a target system (e.g., user agent). In these types of implementations, for example, steps 6-10 described above with reference to FIG. 2 are not required and can be skipped. Notifications, in these implementations, can consist of the message information.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulate data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
identifying, at a backend system, a change to a data object occurring based on an interaction of a first user via a first user interface (UI) of a first application, the data object associated with a change notification rule stored at the backend system, the change notification rule defining at least one target system to be notified in response to changes to the data object, wherein the identified change to the data object corresponds to an interaction associated with the changed data object at a first time;
generating, at the backend system and in response to the identified change to the data object, a notification event identifying the data object associated with the change;
sending, in response to the generation of the notification event and by the backend system, the generated notification event to the at least one target system defined by the change notification rule, wherein the at least one target system is configured to transport the generated notification event to at least one destination system to be notified of the notification event, each of the at least one destination systems separate from the at least one target system, and each of the at least one destination systems associated with a corresponding UI associated with an application, the corresponding UI presenting information associated with the changed data object, wherein the transport of the generated notification event to the at least one destination system is based on a determination that each of the at least one destination systems are presenting, via the corresponding UI, the information associated with the changed data object at the first time;

receiving, at the backend system, a request for the changed data object in response to the sent notification event from one or more of the at least one destination systems; and providing, by the backend system, the changed data object to the the one or more of the at least one destination systems.

2. The computer-implemented method of claim 1, wherein the change notification rule associates data objects with particular target systems, and wherein identified changes to particular data objects associated with a change notification rule result in a generated notification event being sent to one or more corresponding target systems.

3. The computer-implemented method of claim 1, wherein the at least one destination system is registered to receive notifications associated with the changed data object at the target system based on the at least one destination system being associated with a corresponding UI presenting information associated with the data object.

4. The computer-implemented method of claim 1, wherein the at least one target system identifies the at least one destination system based on a target system notification table setting.

5. The computer-implemented method of claim 4, wherein the target system transports the notification event to the at least one destination system without modifying the generated notification event.

6. The computer-implemented method of claim 1, wherein the notification event is sent via a Web Socket connection.

7. The computer-implemented method of claim 1, wherein the notification event is pushed to the at least one target system in response to the generation of the notification event.

8. The computer-implemented method of claim 1, wherein the notification event identifies the data object being changed and change metadata including at least a type of change.

9. The computer-implemented method of claim 1, wherein the generated notification event is sent to a first target system, and wherein a second target system different than the first target system sends the request for the changed data object to a backend system in response to the generated notification event.

10. The computer-implemented method of claim 1, wherein providing the changed data object to the at least one target system includes sending the changed data object to a first target system, wherein the first target system is configured to relay the changed data object to at least one second target system different than the first target system.

11. The method of claim 1, further including pushing publicly accessible information to different target systems.

12. A system comprising:
one or more processors; and
memory storing instructions executable by one or more processors, the instructions for operations on plural systems, wherein the instructions instruct the one or more processors to:
identify, at a backend system, a change to a data object occurring based on an interaction of a first user via a first user interface (UI) of a first application, the data object associated with a change notification rule stored at the backend system, the change notification rule defining at least one target system to be notified in response to changes to the data object, wherein the identified change to the data object corresponds to an interaction associated with the changed data object at a first time;

generating, at the backend system and in response to the identified change to the data object, a notification event identifying the data object associated with the change;

send, in response to the generation of the notification event and by the backend system, the generated notification event to the at least one target system defined by the change notification rule, wherein the at least one target system is configured to transport the generated notification event to at least one destination system to be notified of the notification event, each of the at least one destination systems separate from the at least one target system, and each of the at least one destination systems associated with a corresponding UI, the corresponding UI presenting information associated with the changed data object, wherein the transport of the generated notification event to the at least one destination system is based on a determination that each of the at least one destination systems are presenting, via the corresponding UI, the information associated with the changed data object at the first time;

receive, at the backend system, a request for the changed data object in response to the sent notification event from one or more of the at least one destination systems; and provide, by the backend system, the changed data object to the one or more of the at least one destination systems.

13. The system of claim 12, wherein the change notification rule associates data objects with particular target systems, wherein identified changes to particular data objects associated with a change notification rule result in a generated notification event being sent to one or more corresponding target systems.

14. The system of claim 12, wherein the at least one destination system is registered to receive notifications associated with the changed data object at the target system based on the at least one destination system being associated with a corresponding UI presenting information associated with the data object.

15. A non-transitory computer-readable media encoded with a computer program, the program comprising instructions that when executed by one or more computers cause the one or more computers to perform operations comprising:
identifying, at a backend system, a change to a data object occurring based on an interaction of a first user via a first user interface (UI) of a first application, the data object associated with a change notification rule stored at the backend system, the change notification rule defining at least one target system to be notified in response to changes to the data object, wherein the identified change to the data object corresponds to an interaction associated with the changed data object at a first time;

generating, at the backend system and in response to the identified change to the data object, a notification event identifying the data object associated with the change;

sending, in response to the generation of the notification event and by the backend system, the generated notification event to the at least one target system defined by the change notification rule, wherein the at least one target system is configured to transport the generated notification event to at least one destination system to be notified of the notification event, each of the at least one destination systems separate from the at least one target system, and each of the at least one destination systems associated with a corresponding UI, the corresponding UI presenting information associated with the changed data object, wherein the transport of the generated notification event to the at least one destination system is based on a determination that each of the at least one destination systems are presenting, via the corresponding UI, the information associated with the changed data object at the first time;

receiving, at the backend system, a request for the changed data object in response to the sent notification event from one or more of the at least one destination systems; and providing, by the backend system, the changed data object to the the one or more of the at least one destination systems.

16. The non-transitory computer-readable media of claim 15, wherein the change notification rule associates data objects with particular target systems, wherein identified changes to particular data objects associated with a change notification rule result in a generated notification event being sent to one or more corresponding target systems.

17. The non-transitory computer-readable media of claim 15, wherein the destination system is registered to receive notifications associated with the changed data object at the target system.

* * * * *